United States Patent
Lee et al.

(10) Patent No.: US 6,346,705 B1
(45) Date of Patent: Feb. 12, 2002

(54) HIDDEN PIR MOTION DETECTOR WITH MIRRORED OPTICS

(75) Inventors: Wade Lee, Danville; Donald R. Sandell, San Jose, both of CA (US)

(73) Assignee: Cordelia Lighting, Inc., Rancho Dominguez, CA (US)

( * ) Notice: Subject to any disclaimer, the term of this patent is extended or adjusted under 35 U.S.C. 154(b) by 0 days.

(21) Appl. No.: 09/261,010

(22) Filed: Mar. 2, 1999

(51) Int. Cl.[7] .................................................. G01J 5/02
(52) U.S. Cl. .............................. 250/353; 250/DIG. 1; 340/567
(58) Field of Search ........................... 250/DIG. 1, 353; 340/567

(56) References Cited

U.S. PATENT DOCUMENTS

| | | | |
|---|---|---|---|
| 3,203,306 A | 8/1965 | Lefferts | 359/742 |
| 3,631,434 A | 12/1971 | Schwartz | 340/567 |
| 3,703,718 A | 11/1972 | Berman | 340/567 |
| 3,928,843 A | 12/1975 | Sprout et al. | 340/567 |
| 3,958,118 A | 5/1976 | Schwartz | 250/221 |
| 3,988,726 A | 10/1976 | Reiss et al. | 340/567 |
| 4,268,752 A | 5/1981 | Herwig et al. | 250/353 |
| 4,321,594 A | 3/1982 | Galvin et al. | 340/567 |
| 4,339,748 A * | 7/1982 | Guscott et al. | 340/555 |
| 4,703,171 A | 10/1987 | Kahl et al. | 250/221 |
| 4,880,980 A * | 11/1989 | Muller et al. | 250/353 |
| 4,939,359 A | 7/1990 | Freeman | 250/221 |
| 5,089,704 A | 2/1992 | Perkins | 250/342 |
| 5,282,118 A | 1/1994 | Lee | 362/276 |
| 5,434,764 A | 7/1995 | Lee et al. | 362/276 |
| 5,442,532 A * | 8/1995 | Boulos et al. | 362/276 |
| 5,575,557 A | 11/1996 | Huang et al. | 362/276 |
| 5,590,953 A | 1/1997 | Haslam et al. | 362/276 |
| 5,608,220 A | 3/1997 | Wieser et al. | 250/353 |
| 5,626,417 A | 5/1997 | McCavit | 362/276 |
| D382,082 S | 8/1997 | Huang et al. | D26/142 |

* cited by examiner

Primary Examiner—Seungsook Ham
Assistant Examiner—Shun Lee
(74) Attorney, Agent, or Firm—Paul Y. Feng; Fulwider Patton Lee & Utecht, LLP

(57) ABSTRACT

A motion detector assembly for a decorative lighting fixture that conceals the presence of the motion detector in a decorative element integrated into the design of the lighting fixture and that uses only mirrored optics instead of Fresnel lenses. The motion detector assembly includes a housing having a decorative external appearance harmonious with the style of the lighting fixture and forming an integral part of the lighting fixture. Included within the housing are a mirror assembly and PIR sensor. The mirror assembly includes a number of mirror faces that define a number of monitored zones in the field of view. Each respective mirror face defines an optical path in which radiation admitted through an aperture in the housing from an associated zone is directed to the sensor solely by the respective mirror face without the need for secondary mirrors or auxiliary lenses to complete the optical path. The mirror assembly can provide for two or more vertical levels of view and can provide for a wide angular field of view at one or more of the vertical levels of view. The mirror faces are arranged in tiers, and at least one tier is formed with distal extremities extending forward and looking to the sides so that a ray path emanating from a zone at the lateral reaches the field of view passes beneath a first distal extremity and reflects off the mirror face at the other distal extremity to the sensor. With this disposition of mirror faces at the distal extremities the tier is able to define a field of view having an angular width of at least 160 degrees and, depending on the length and shape of the tier and angular configuration of the distal extremities, extending at least up to 220 degrees. An aperture cover transmissive to infra-red radiation conforms to the shape of the housing around the aperture but otherwise plays no optical role in the operation of the motion detector, thereby giving the lighting fixture designer more aesthetic freedom in designing the motion detector housing.

31 Claims, 6 Drawing Sheets

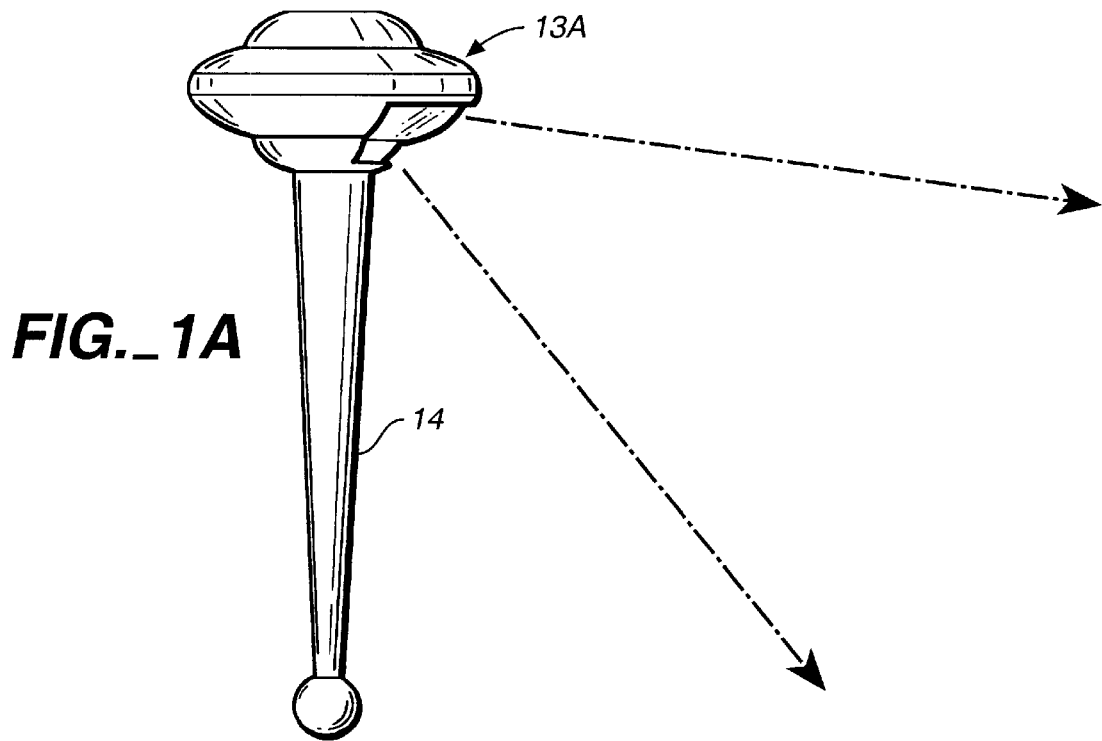
FIG._1A
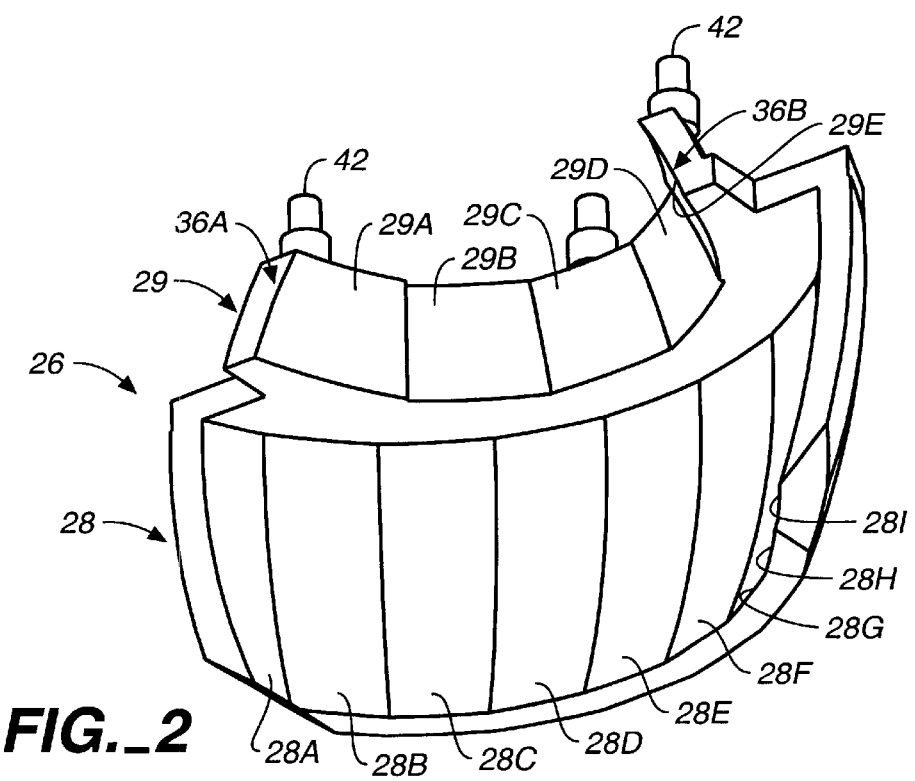
FIG._2

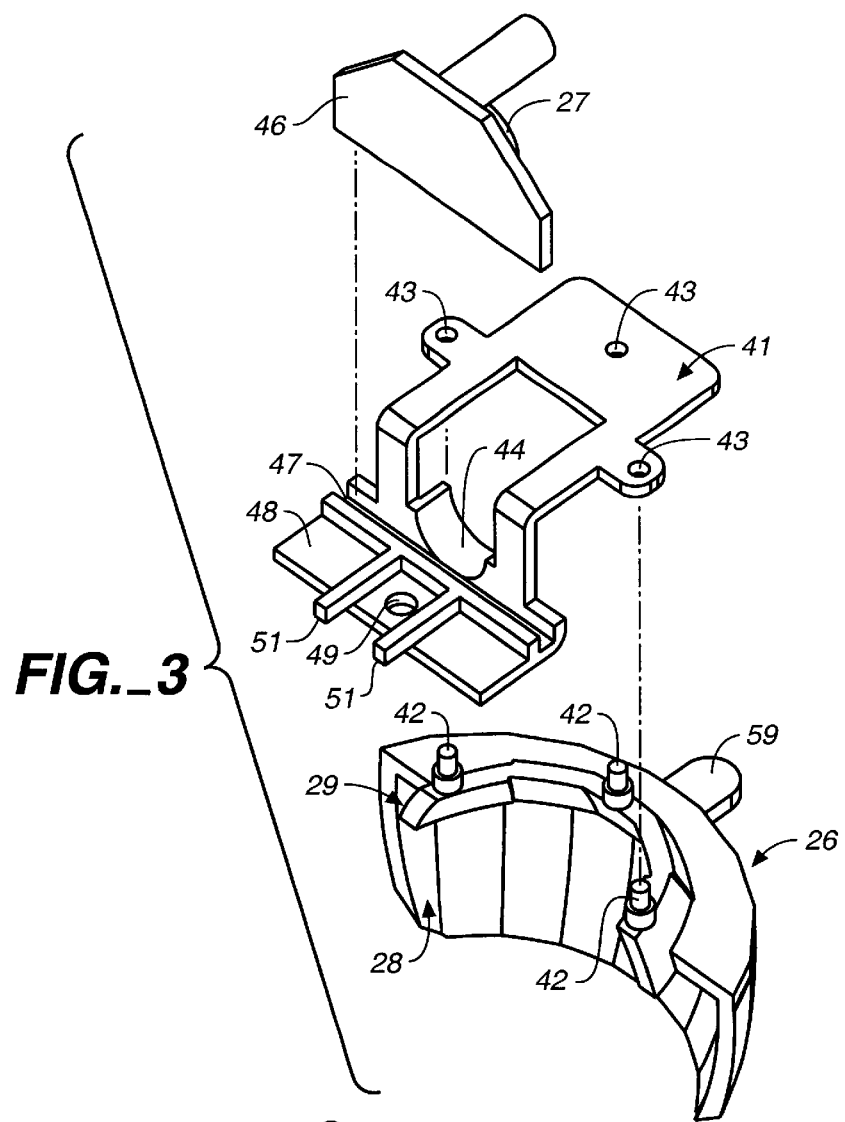
FIG._3
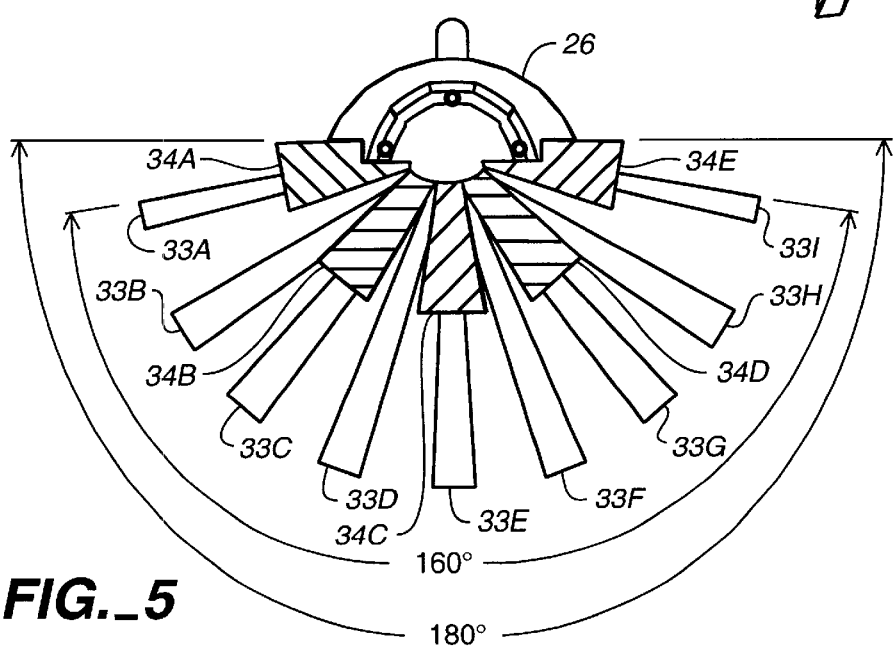
FIG._5

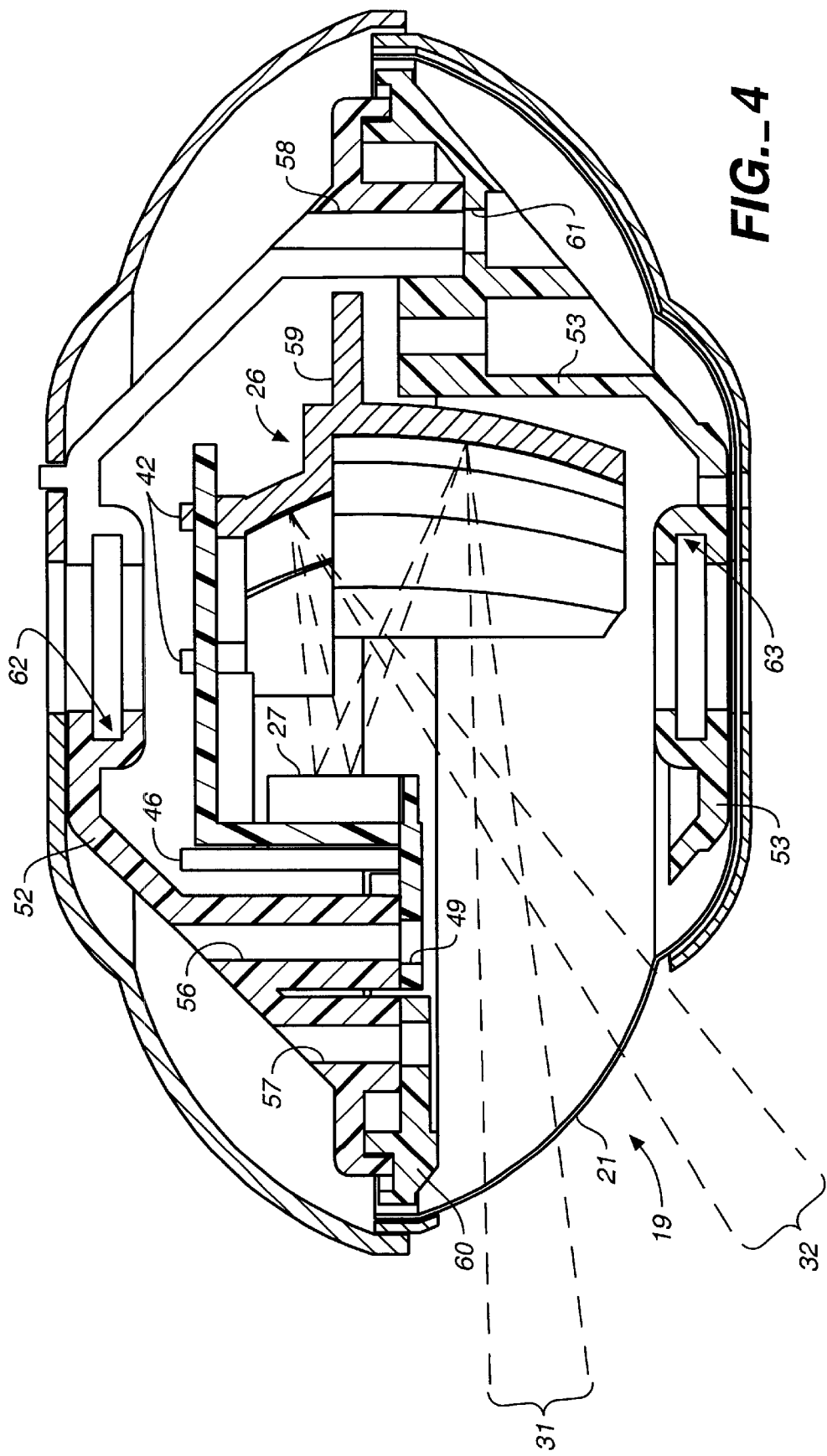
FIG._4

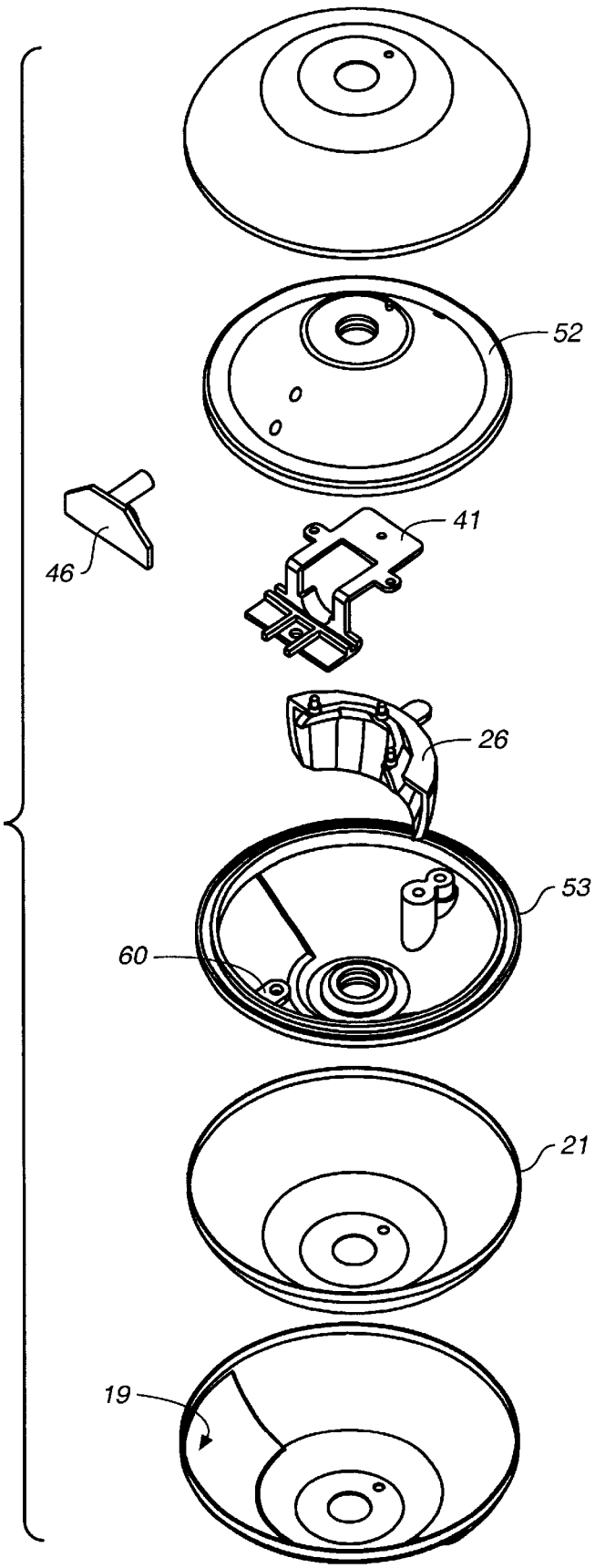
FIG._6

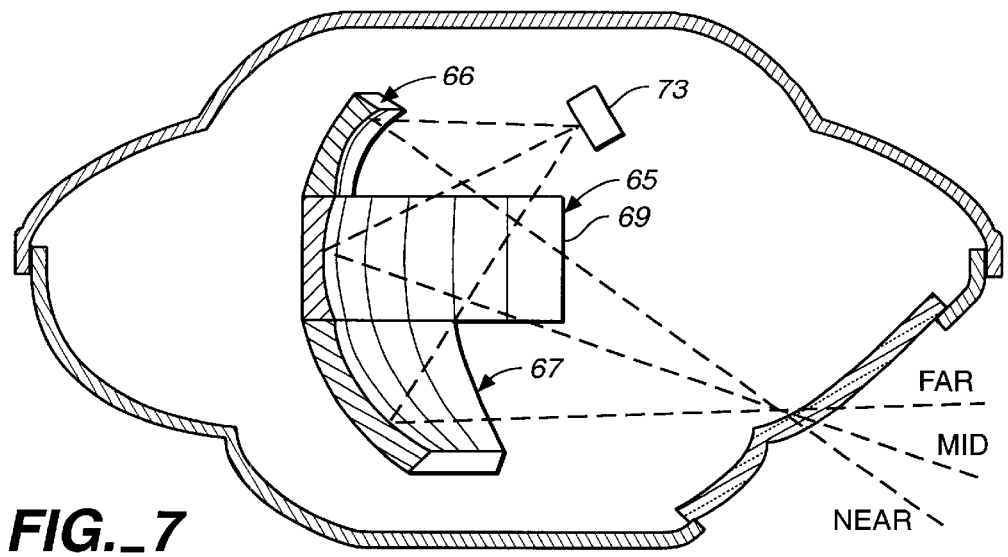
FIG._7
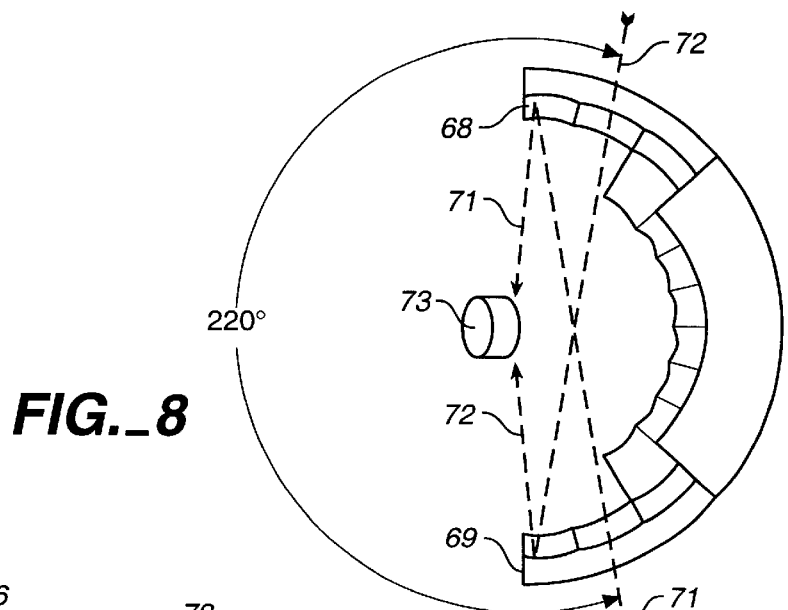
FIG._8
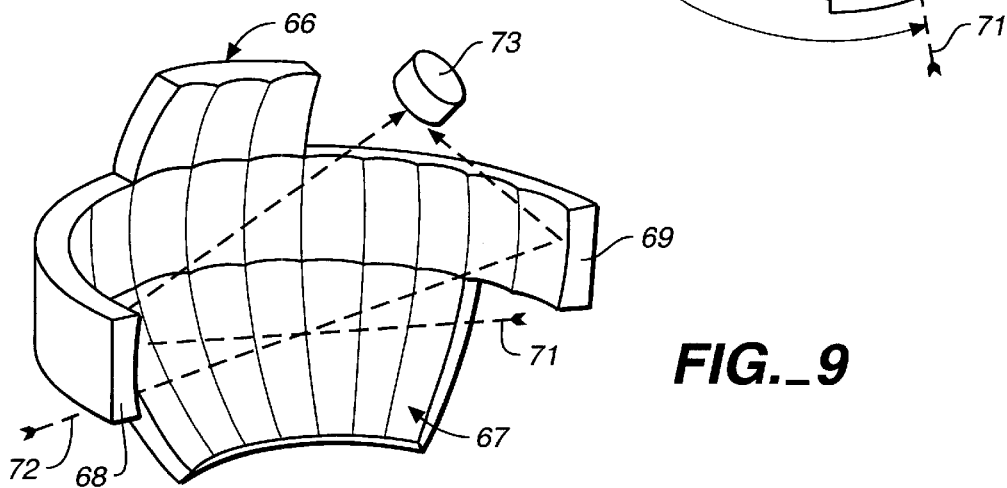
FIG._9

HIDDEN PIR MOTION DETECTOR WITH MIRRORED OPTICS

BACKGROUND OF THE INVENTION

The present invention relates to passive infrared motion detectors of the type used in residential outdoor lighting fixtures, for example, to illuminate a walkway or driveway when a person or automobile approaches. The invention is more particularly directed to arrangements for making the motion detector an inconspicuous element of the lighting fixture and to a mirror arrangement suitable for use in such motion detectors.

Lighting devices that automatically turn on a light when a person or a motor vehicle approach have been known for some time. A popular form of such device is responsive to infra-red radiation emitted by a person or motor vehicle as the person or vehicle moves within the field of view of the device. These devices are generally referred to as passive infra-red, or "PIR," motion detectors and light fixtures.

The first PIR motion detectors were not used with light fixtures at all, but were used in surveillance and alarm systems to monitor for intruders. They were stand-alone devices and tended to be large and bulky in appearance. They employed assemblies of germanium lenses or multi-faceted mirrors or combinations of mirrors and lenses to direct infra-red radiation from an object moving in the field of view to a PIR sensor. The first commercial PIR motion detectors for activating lights were used with utilitarian lighting such as flood lights or other area lighting. Although the motion detectors were bulky and quite conspicuous, that was not seen as a significant drawback in view of their utility in activating the lights in response to intruders. Examples of early PIR motion detectors employing lenses, mirrors and various combinations may be seen in U.S. Pat. Nos. 3,631,434 and 3,958,118 to Schwarz; 3,703,718 to Berman; 3,928,843 to Sprout et al.; 3,988,726 to Reiss et el.; and 4,268,752 to Herwig et al.; and various patents cited therein.

Later, utilitarian PIR light fixtures appeared in which the mirrored optics and germanium lens optics were replaced with plastic Fresnel lens optics. A Fresnel lens of the sort used in connection with motion detectors comprises a thin sheet of flexible plastic material that permits infra-red radiation to pass through it and on which are formed a number of individual Fresnel lens segments or lenslets. See for example U.S. Pat. No. 3,203,306 to Lefferts for an individual Fresnel lens segment formed on such a plastic sheet and U.S. Pat. Nos. 4,321,594 to Galvin or 4,703,171 to Kahl et al. for a segmented Fresnel lens having a plurality of lens segments side-by-side on a plastic sheet. The segmented Fresnel lens was considerably simpler and less expensive to manufacture than the previously employed mirror or germanium lens arrangements and permitted the motion detector units to be made considerably more compact. The flexible plastic sheet on which the lens segments were formed occupied little volume and could be supported with a simple bracket structure at the edges of the sheet with no need for additional brackets to support the individual lens segments. Moreover, the plastic sheet could be bent into a semi-cylindrical or similar curved shape to position the individual lens segments more or less uniformly about the PIR sensor. With the introduction of the flexible plastic segmented Fresnel lens, the earlier lens and mirror arrangements were eschewed in favor of new Fresnel lens arrangements, which were more compact, inexpensive, lightweight, and generally easier to work with.

With the sheetlike segmented Fresnel lens PIR motion detectors could be made considerably less obtrusive, and they were soon added to decorative light fixtures as well as utilitarian ones. At first the motion detector was located in a small housing mounted on an intermediate backplate, which was mounted on a wall over an electrical junction box, and to which the decorative lighting fixture, in turn, was mounted. Such a backplate-mounted motion detector is illustrated in FIG. 1 of U.S. Pat. No. 5,590,953 Haslam et al. This arrangement became commercially feasible because of the segmented Fresnel lens, which permitted the motion detector housing to be sufficiently compact that it lessened the distraction from the decorative nature of the lighting fixture.

In recent years the trend has been to incorporate the motion detector within the decorative light fixture itself to make it less obtrusive either by concealing it altogether or at least by giving it a decorative appearance so that it does not detract appreciably from the ornamental style of the light fixture. Examples of PIR lighting fixtures that endeavor either to conceal the motion-detecting unit or to embellish it so as to enhance its decorative appearance may be seen in U.S. Pat. Nos. 5,282,118 and 5,434,764 to Lee et al.; 5,575,557 and Des. 382,082 to Huang et al.; 5,590,953 to Haslam et al.; and 5,626,417 to McCavit.

When the motion-detecting unit is incorporated into the body of a decorative light fixture, the flexible plastic lens is generally formed to be a part of a wall of some portion of the fixture and may be tinted to blend in with the fixture body. Thus, in FIG. 2 of U.S. Pat. No. 5,590,953 the segmented Fresnel lens forms part of a cylindrical wall and in FIG. 3 of the same patent it is shaped to form a portion of a conical wall. This construction imposes a limitation on the lens optics. In decorative fixtures the nature of the fixture body—its curvature, slope, profile and overall shape—is chosen primarily by aesthetic considerations to give the fixture its decorative appearance and to some extent by manufacturability considerations to maintain a lower cost. The resulting fixture body design, however, then constrains the optics of the segmented Fresnel lens, which will generally follow the contour of a wall of the fixture body. That is, the Fresnel lens may be disposed in a fixture wall at an angle or as part of a curved surface so as to impair the ability of the lens to focus radiation from a desired direction on the sensor. Alternatively, the aesthetic design of the light fixture may be compromised so as to provide a more favorable optical environment for the segmented Fresnel lens. In one attempt to circumvent this problem, U.S. Pat. No. 5,626,417 provides a window in the fixture wall with a plastic cover and places the segmented Fresnel lens in a cylindrical optical disposition inside the fixture behind window.

Meanwhile another trend has been to provide decorative fixtures with longer range and wider fields of view to cover the many arrangements in which the fixture may be mounted by a front door or driveway. This makes greater demand on the optics of the segmented Fresnel lens at the same time that the ornamental requirements on the lighting fixture constrain the feasible optical arrangements of the lens.

SUMMARY OF THE INVENTION

The present invention provides a motion detector assembly for a decorative lighting fixture that conceals or disguises the presence of the motion detector in a decorative element that may be integrated in a natural and graceful manner into the design of the lighting fixture without the limitations on design imposed by the use of the segmented Fresnel lens.

Briefly, a lighting fixture according to the invention includes a motion detector housing that is shaped to have a decorative external appearance harmonious with the style of the lighting fixture and forming an integral part of the lighting fixture. The decorative housing is formed with an aperture for admitting infra-red radiation into the housing from the monitored field of view. An aperture cover extends over the aperture to protect the interior and to conceal the presence of the aperture. The aperture cover is transmissive to infra-red radiation and generally conforms to the shape of the housing in the vicinity of the aperture so as to conceal the presence of the aperture. Mounted within the decorative housing are a passive infra-red (PIR) sensor and a mirror assembly that directs infra-red radiation from the field of view to the sensor. The mirror assembly comprises a plurality of mirror faces that define a plurality of monitored zones in the field of view. Each respective mirror face defines an optical path in which radiation admitted through the aperture from an associated zone is directed to the sensor solely by the respective mirror face. That is to say, the optical paths are defined by the mirror assembly alone with only a single reflection taking place for each optical path, and it is not necessary to employ secondary mirrors or auxiliary lenses to complete the optical path. Notwithstanding the absence of secondary mirrors or auxiliary lenses, the motion detector remains sufficiently compact that it may be comfortably hidden in a decorative element with little or no compromise in the artistic aspects of the decorative element. Moreover, the mirror faces may be arranged to direct radiation to the sensor from zones positioned at two or more vertical levels of view in the lighting fixture's field of view and to provide a wide-angle field of view so that there need be little or no compromise in the utilitarian aspects of the motion detector. In this way the motion detector does not depend on the use of Fresnel lenses and thereby avoids any limitations and deficiencies of the plastic segmented Fresnel lens, yet the motion detector does not require that the aesthetic design of the lighting fixture be compromised. In fact, since the aperture cover is only provided for protection and/or concealment and plays no optical role in the operation of the motion detector, the lighting fixture designer is given more freedom in the development of aesthetic designs, and the motion detector arrangement of the present invention may be incorporated into more intricate or complex designs than is otherwise feasible with the prior art where the aperture cover must also carry an array of Fresnel lenslets.

The mirror assembly may be specially arranged according to the invention to achieve a field of view that is wide angle and at the same time has at least two vertical levels of view. The mirror assembly has a first section that defines a first tier of side by side mirror faces terminating in distal extremities. The infra-red sensor is positioned in front of the mirror assembly, and the mirror faces are formed and disposed to direct infra-red radiation to the sensor from a first laterally extending region in the field of view of the motion detector. The distal extremities and the sensor are arranged so that a ray path emanating from a zone at the lateral reaches of the first region in the field of view passes beneath a first distal extremity of the tier and reflects off the mirror face at the other distal extremity to the sensor. In this manner the tier of mirror faces is able to define a field of view in the direction of the first region having an angular width of at least 160 degrees and, depending on the length and shape of the tier and angular configuration of the distal extremities, extending at least up to 220 degrees.

By way of summary, it is an object of the invention to provide a small unobtrusive motion detector housing for use with a decorative lighting fixture that avoids the use of the customary sheetlike segmented Fresnel lens. It is a further object of the invention to provide a motion detector housing that is decorative in appearance and that conceals or disguises the presence of the motion detecting apparatus. It is a further object of the invention to provide a motion detector housing arrangement with disguised or concealed motion detecting apparatus that is easily adaptable to a variety of decorative configurations so as to give a degree of freedom to the aesthetic designer to design the outward shape and appearance of the housing without unduly constraining the optical arrangement of the motion detector. It is yet a further object of the invention to provide an unobtrusive decorative motion detector housing with concealed or disguised motion detector apparatus that nevertheless provides a wide field of view (at least 160 degrees) and a plurality of vertical levels of view.

Other objects, aspects, advantages, and novel features of the invention are described below or will be readily apparent to those skilled in the art from the following specifications and drawings of illustrative embodiments.

BRIEF DESCRIPTION OF THE DRAWINGS

FIG. 1A is a side elevational view showing an alternative embodiment of decorative motion detector housing.

FIG. 2 shows a perspective view of a first embodiment of mirror assembly according to the invention.

FIG. 3 is an exploded perspective view of the mirror assembly of FIG. 2 and sensor mounting arrangement.

FIG. 4 is a cross-sectional view of a motion detector housing with the optical arrangement of FIG. 3 showing the mirror assembly, sensor and support structures.

FIG. 5 is a plan view of the mirror assembly of FIG. 2 showing the pattern of monitored zones.

FIG. 6 is an exploded perspective view of the motion detector housing, mirror assembly and support structures of FIG. 4.

FIG. 7 is a side cross-sectional view of the motion detector housing from the fixture of FIG. 1A containing a second embodiment of a mirror assembly according to the invention shown in elevation.

FIG. 8 is a top plan view of the mirror assembly and sensor of FIG. 7.

FIG. 9 is a perspective view of the mirror assembly and sensor of FIG. 7.

DETAILED DESCRIPTION OF ILLUSTRATIVE EMBODIMENTS

Figure 1:
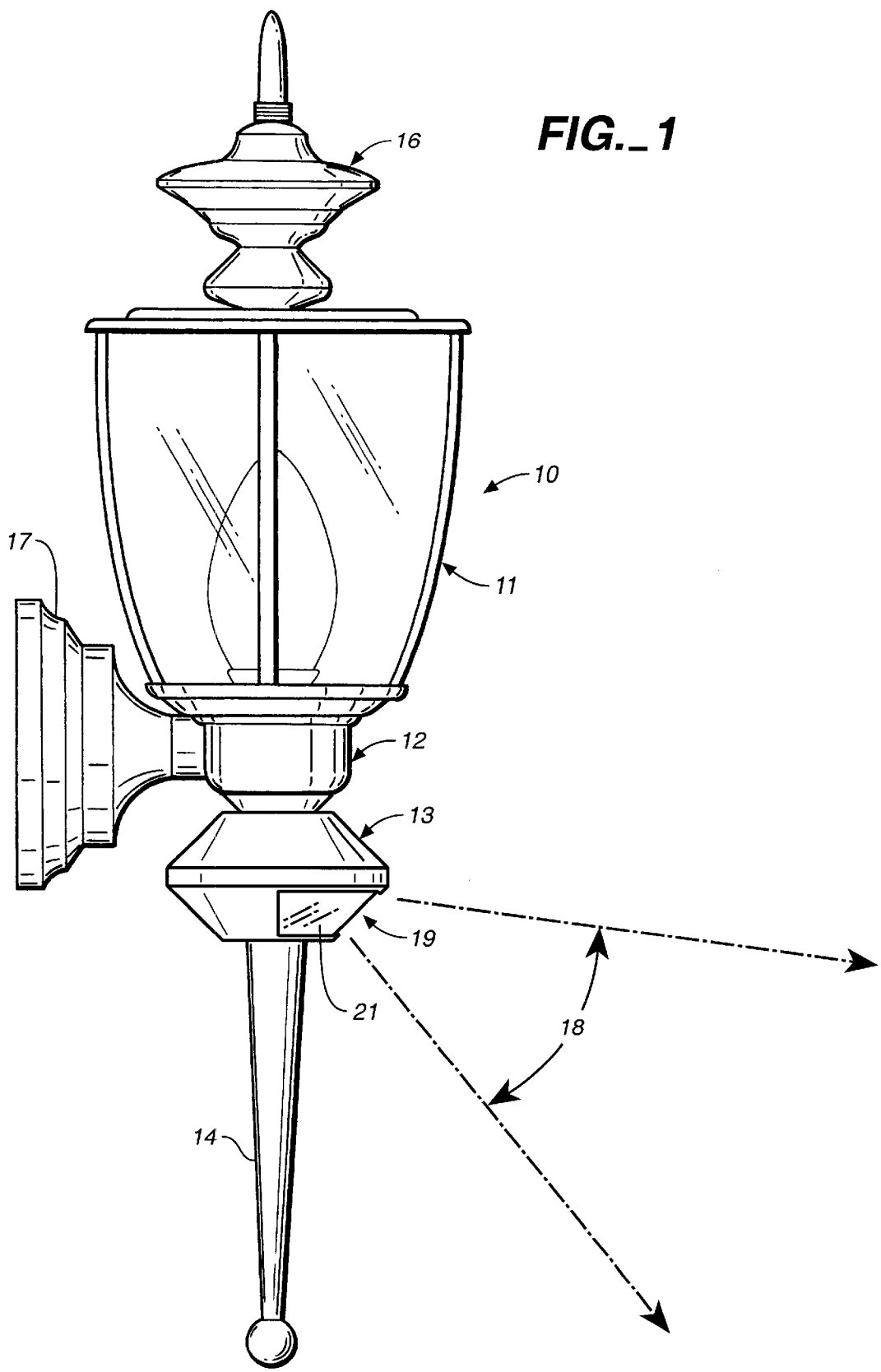
FIG. 1 is a side elevational view of a decorative lantern for use with a motion detector according to the invention.

FIG. 1 shows a decorative lighting fixture 10 including a motion detector according to the present invention. Fixture 10 includes a decorative body including a globe assembly 11 for housing a light bulb and an associated enclosure 12 for housing the light bulb socket and electrical connections. Extending below enclosure 12 are a rounded decorative element 13 and elongated tail member 14. Situated above globe assembly 11 is another rounded decorative element 16. The lighting fixture is mounted to an exterior wall of a house or other structure by mounting base 17.

In the embodiment of FIG. 1 decorative element 13 serves more than just an ornamental function; it also serves as a motion detector housing. In general, a motion detector housing according to the invention, such as housing 13, is shaped to have a decorative external appearance and is disposed to form an integral part of the lighting fixture. As used herein "an integral part of" or "integral to" the lighting fixture is intended to mean incorporated into the fixture itself so as to form a harmonious part of the fixture design, as opposed to being independently mounted or being an inharmonious, stand-apart adjunct to the fixture. Thus, "integral" to the fixture is intended to distinguish a motion detector located in the fixture itself from one mounted separately or one mounted on a backplate.

In the example of FIG. 1 decorative element 13 is a common pre-existing shape of decorative element for lighting fixtures. With the present invention such pre-existing decorative elements may be adapted for use as a motion detector housing without having to compromise the overall pre-existing aesthetic nature of the lighting fixture. The invention is not limited to the use of pre-existing shapes for the motion detector housing, however, and the designer of lighting fixtures will have greater freedom of design to choose whatever ornamental shape and appearance are desired for the motion detector housing since, as explained more fully below, the external surfaces of the motion detector housing in the present invention do not have to play an active optical role in the functioning of the motion detector.

Lighting fixture 10 has a field of view delineated in FIG. 1 by its vertical boundaries and indicated generally by reference numeral 18. Motion detector housing 13 is formed with an aperture 19 for admitting infra-red radiation emanating from field of view 18. Aperture 19 is shown in FIG. 1 as a laterally extending opening, wider than it is tall. The aperture will preferably have a shape complementing the aesthetic design of the housing, although the only physical limit on the aperture is that it be such as to permit radiation from the desired zonal pattern in the field of view to enter the housing and extend to the mirror assembly contained inside so as to be reflected to the PIR sensor. As shown in the accompanying figures, the aperture forms a single opening in a wall of a portion of the lighting fixture. While this is the simplest configuration, in individual cases the fixture designer may want to provide two or more openings for the aperture, for example, side by side laterally extending openings separated by narrow strips or fillets, or some other such pattern to complement the fixture design. Such compound apertures are within the contemplation of the invention provided only that the partitions between compound aperture openings not interfere in a substantial way with the zonal pattern of the field of view. For simplicity "aperture" is used herein in the singular, but is intended to include such compound apertures as well.

Aperture 19 is covered by aperture cover 21, which is transmissive to infra-red radiation and which is formed to generally conform to the shape of the housing wall in the vicinity of the aperture. Aperture cover 21 serves to protect the components of the motion detector included within the housing from dust, moisture or other degradation factors to which the lighting fixture might be exposed. Aperture cover 21 also serves to conceal or camouflage the aperture or at the least make it less conspicuous. To this end, the aperture cover should generally give the appearance of continuing the housing wall over the aperture, or if not uninterruptedly continuing the housing wall, then at least providing a decorative look comporting with the motion detector housing's overall decorative look. For a more intricate shape of motion detector housing including for example decorative ridges, indentations or complex curvatures, the practicalities of manufacturability may call for the aperture cover to depart somewhat from precise conformance with the shape or curvature of the housing wall. Such small departures, however, will not generally detract from the inconspicuousness of the aperture as seen from a reasonable viewing distance, and such an aperture cover is nevertheless considered to conform to the shape of the housing wall for the purposes of the invention. To make the aperture cover even more inconspicuous, the aperture cover may be tinted to suggest the color of the motion detector housing wall.

The aperture cover may be formed of a plastic material such as is commonly used for the flexible substrate in the fabrication of segmented Fresnel lenses for PIR motion detectors of the prior art. Suitable materials and tinting methods are well known and need not be discussed in any detail here. The particular material may be selected or treated to preferentially pass infra-red radiation in a narrow band of wavelengths around the peak of infra-red wavelengths characteristically emitted by humans and to substantially attenuate wavelengths outside of that band. An aperture cover of such material is nevertheless transmissive to infra-red radiation for the purposes of the invention notwithstanding that it may significantly attenuate certain other infra-red wavelengths that are not of interest for detection of moving persons.

Before discussing the optical arrangement of the motion detector, it is instructive to consider further the motion detector housing itself. The housing will be shaped to present a generally decorative external appearance if its shape includes ornamental design elements that comport with or complement the ornamental appearance of the lighting fixture with which it is intended to be used. This is desirable to make the motion detector inconspicuous. A number of locations are available to serve as a motion detector housing, and the motion detector housing need not be a self-contained unit exclusively housing the motion detector components, but may also include other components as well. Thus, for example, the motion detector housing may be provided in an extended enclosure 12 at the base of the globe assembly 11 or may be incorporated into the decorative element 16 positioned above globe assembly 11 or in the design of the tail member 14.

FIG. 1A shows an alternative motion detector housing 13A that may be used in the lighting fixture of FIG. 1 in place of decorative element 13. Lighting fixture 10 with either of the motion detector housings 13 or 13A is an adaptation of a classic design descending from the oil lamps used on horse-drawn coaches in centuries past. The decorative elements 13 and 13A are the vestigial remains of the oil reservoirs, generally called fonts, in antique coach lamps. There are many alternative designs for such decorative fonts, some more ornate than others, which are common in the designs of classic lighting fixtures as well as more modern adaptations. For example, the top and bottom portions of the decorative fonts may each be formed of one smoothly curved section or with two or more sections of different curvature profiles joined at boundary edges to give an overall stepped appearance, such as the decorative element 13A. The top or bottom portions may also include one or more conical or frusto-conical segments giving the housing a profile with one or more flat segments, such as the decorative element 13. Some fonts may be flatter or oblate; others may be more cup-shaped or prolate. Decorative font designs may also include small decorative grooves, depressions, ridges or irregularities adding to the aesthetic appeal of the font. Such ornamental design elements have little effect, if any at all, on the volume of space available within the decorative font for housing the motion detector. By way of terminology the shape of the upper and lower portions of a decorative font, whether they are prolate or oblate, are referred to herein generically as "generally saucer-shaped."

The present invention makes it possible to use such decorative fonts as the housing for a motion detector. In the past this has been attempted with partial success using segmented Fresnel lenses formed on a plastic lens substrate to form a part of the decorative font wall. It is desirable to form the lens substrate into a shape that blends in with the fixture design. If Fresnel lenslets are to be formed on the lens substrate, however, the positioning of the lenslets may be limited by the intricacies of the lens substrate shape dictated by the decorative font design. For example, forming the substrate with a compound curvature with indentations, bulges or other features added leads to a compromise in cost and/or performance. It may cost more to form the lenslets on a pre-formed doubly curved surface than on a flat one and may produce a reduction in lens performance. Moreover, in some applications the lens substrate may have to depart from the shape of a complex housing wall to an unaesthetic degree just to give the desired field of view or zonal pattern, or alternatively other mirrors may be required to give a wider field of view difficult to achieve with contorted Fresnel lenslets alone and this increases the cost and complexity of fabrication. For several hundred years artisans have refined the designs of decorative fonts, chimneys, and other decorative elements on lanterns, appealing to the sense of beauty, and with the use of segmented Fresnel lenses for the motion detector optics most of these decorative designs are, as a practical manner, unavailable. With the present invention the aperture cover, which is free of Fresnel lenslets, may be formed in more ornate configurations more faithfully replicating the decorative design of a font or other decorative element without concern for the constraints that would otherwise be imposed by Fresnel lenslets.

Turning now to the optical performance of the motion detector, FIGS. 2–6 show a mirror assembly 26 and PIR sensor 27, which are disposed within the motion detector housing. Mirror assembly 26 includes two tiers 28 and 29 of mirror faces 28A–28I and 29A–29E, respectively. The collection of mirror faces defines a plurality of monitored zones in the field of view of the fixture. Each mirror face directs infra-red radiation emanating from a target source, such as a person or motor vehicle, located in an associated zone to PIR sensor 27. The use of such zones to detect motion is well known in the art and need not be described in detail here. The path followed by the infra-red radiation as it leaves the target source in a zone and travels to sensor 27 is commonly referred to as the optical path. In the present invention an optical path is defined from each zone to sensor 27 solely by the associated mirror face without the intermediation of any other optical element substantially altering the optical path. That is to say, IR radiation from a target passes through the aperture and is reflected off a single mirror face directly to the sensor without being bent or otherwise focused or redirected by any other lens, grating, mirror or other such path-altering element.

The two tiers 28 and 29 of mirror faces define two vertical levels of view at which the motion detector monitors field of view 18. These two levels may be seen in the side view of FIG. 4, which shows the optical paths of IR radiation delineating the boundaries of two representative zones in the field of view. The two levels correspond to far zones and near zones. A first optical path 31 represents radiation received from a far zone. The radiation entering aperture 19 and passing through aperture cover 21 reflects off of a mirror face from tier 28 directly to sensor 27. A second optical path 32 represents radiation received from a near zone. Entering radiation reflects directly off of a mirror face from tier 29 to sensor 27.

FIG. 5 shows the pattern of monitored zones produced with the mirror embodiment of FIG. 2. The far level of view consists of nine zones 33A–33I spread over an azimuthal angle of about 160 degrees. The near level of view consists of five zones 34A–34E spread over an azimuthal angle of about 180 degrees. This example shows lateral zones extending at least 90 degrees to the side of the lighting fixture. For simplicity of illustration FIG. 4 shows one zone associated with each mirror face. Those skilled in the art of PIR motion detectors will understand that each such illustrated zone may be composed of two or more subzones if PIR sensor 27 itself contains two or more separate and distinct sensing elements. For purposes of illustration, however, the simplified zonal pattern of FIG. 5 suffices.

For most practical decorative motion-activated lighting fixtures it is desirable to have at least two levels of view. The reason for this is that most decorative motion-activated lighting fixtures have to look for persons entering the field of view from two different sides. The typical decorative fixture is mounted on an exterior wall usually by a front door or a garage door. The detector monitors the far zones for visitors or intruders approaching the house and entering then field of view from the street. The detector also monitors the near zones for persons coming out of the house and stepping into the field of view right by the fixture. Thus, for the typical application it is preferable that the mirror assembly provide at least two vertical levels of view and, moreover, that the near level of view cover a wide angle on the order of 180 degrees (i.e., lateral zones extending at least 90 degrees to the side of the motion detector) to respond to persons entering the field of view from a door on either side of the fixture. However, although not the preferred embodiment for general-purpose outdoor decorative lighting fixtures, it may nevertheless occasionally be desired to have only one level of view for a specialty application, and decorative fixtures employing such single-viewing-level configurations of the mirrored optics taught herein also fall within the purview of the invention.

Mirror assembly 26 provides both a wide-angle field of view and at the same time has two vertical levels of view. The mirror faces of mirror tier 29 are arranged in a generally arcuate line terminating in distal extremities 36A and 36B which extend forward with respect to the midpoint of the tier. PIR sensor 27 is positioned in front of the mirror assembly, and the mirror faces 29A–29E direct infra-red radiation to the sensor from the laterally extending near zones 34A–34E. Distal extremities 36A and 36B and sensor 27 are arranged so that a ray path emanating from a zone 34A (or 34E) at the lateral reaches of the zone passes beneath distal extremity 36A (or 36B, respectively) and reflects off the mirror face 29E (or 29A, respectively) at the other distal extremity 36B (or 36A, respectively) and is directed to sensor 27. In this manner mirror tier 29 defines a near field of view having an angular width of about 180 degrees.

The mirror faces of tier 28 are also arranged along an arcuate line and in the illustrated embodiment define a far field of view having an angular width of about 160 degrees. Notwithstanding the confined space in which the mirror assembly and sensor are housed, a disposition can be achieved in which mirror tier 28 achieves an angular width of about 160 degrees without the extreme mirror faces of the tier having to look underneath opposite extremities of tier 28. To prevent interference of the two vertical levels of view with one another, the extreme mirror faces 28A and 28I of the tier 28 are cut away so that they are each half the width of the middle ones 28B–28H. In this way the extreme mirror faces 29A and 29E of the upper tier 29 extend sufficiently forward from tier 28 so that mirror faces 29A and 29E have clearance to look down and to the sides, skirting past the lateral extremities of the lower tier 28.

The size of the mirror assembly needed to achieve adequate coverage is a necessary consideration since the mirror assembly, sensor and supporting structures must all fit within the decorative motion detector housing without interfering with the desired optical paths. An embodiment of mirror assembly 26 actually constructed and achieving the objects of the invention measures roughly 4.8 cm across and 2 cm deep, which is a convenient size to fit comfortably within a typical decorative font used in decorative coach-style lighting fixtures. The nine faces 28A–28I comprising mirror tier 28 and defining the far zones are each in the form of a spherical segment having a radius of curvature of 48 mm. The segments are roughly 2 cm tall, and the middle seven segments are each about 6 mm across at their widest point, the two end segments each being about 3 mm across. The nine faces are arranged side by side along an approximately circular arc. The five mirror faces 29A–29E are truncated spherical sections roughly 7 mm high and having different radii of curvature. The radius of curvature for middle face 29C is 40 mm, for faces 29B and 29D is 38 mm, and for the extreme faces 29A and 29E is 32 mm. The upper segments are all inclined downward so that their optic axes look downward at an angle of about 30 degrees to the horizontal. In general, it is desirable that tier 29 be aimed downward in the range of about 30 to 45 degrees.

The radius of curvature of 48 mm for the mirror faces defining the far zone was selected to optimize the detection of a human target at a distance of 30 feet. The common IR sensor available for use in motion detectors includes two side by side active sensor elements. The area of one of these sensor elements projected out to the field of view by means of a 48-mm mirror face from tier 28 will be roughly the width of a human body.

Mirror assembly 26 may be molded of plastic and coated with a reflective coating. Coating techniques for making a reflective surface are well known and need not be discussed in any detail here. The molding process is greatly facilitated by the use of a sequence of radii of curvature for the faces 29A–29E of the near-zone mirror tier 29. To achieve the balanced dispositions of the near-zone optical paths shown herein (FIG. 5), in part because of the necessarily close spacing of sensor 27 from the mirror faces within the confines of the decorative motion detector housing, it is generally necessary for the near-zone mirror faces 29A, B, D and E to be disposed off-axis while the central mirror face 29C is on-axis. If all these mirror faces had the same radius of curvature, then to define a balanced pattern of near zones uniformly distributed about a central axis neighboring mirror faces would have to be displaced forward and back from one another in the direction of the sensor. That is to say, there would be gaps extending in the sensor direction between any one mirror face and a neighboring mirror face. For example, mirror face 29E would be displaced back with respect to face 29D, which would be displaced back with respect to face 29C. With such a disposition one mirror face would partially mask a neighboring face, creating dead spaces and reducing the effectiveness of the mirror faces. In addition, a more complicated mold arrangement would be needed to fabricate the displaced mirror disposition. By a judicious choice of the radii of curvature, however, the mirror faces 29A–29E may be arranged substantially to abut or border on one another along an approximate circular arc with little or no radial offset of laterally neighboring faces with respect to one another. This arrangement may be fabricated in a much simpler molding process using only two mold halves which may be pulled apart easily, and this provides a lower cost of manufacture. In this configuration any radial offset of neighboring mirror faces should be sufficiently small so as not to impair the molding process, and neighboring faces displaced from one another by such small radial offsets will nevertheless be said to abut one another. Those skilled in the art of PIR motion detector optics will readily be able to determine appropriate curvatures, and in particular specific sequences of radii of curvature to achieve this result, for any desired configuration given the benefit of the examples and specifications provided here. In addition, although the mirror faces are illustrated here with a spherical curvature, other curvatures may also be used, for example, parabolic for greater effective focusing power if a significantly longer range is desired.

Sensor 27 is held in position by a plastic sensor bracket 41, which is secured directly to mirror assembly 26. Mirror assembly 26 is formed with three attachment lugs 42 projecting upward from the top of the mirror assembly. Bracket 41 is formed with three mating holes 43 for receiving lugs 42. Bracket 41 may be heat-staked to the mirror assembly by means of lugs 42. Bracket 41 includes a portion defining a cradle 44 for receiving sensor 27. The sensor is itself secured to a small printed circuit board 46, and bracket 41 includes a groove 47 for receiving the lower edge of printed circuit board 46. Bracket 41 holds mirror assembly 26 and sensor 27 in a desired relative disposition. Bracket 41 terminates at its forward end with horizontally extending tab 48 formed with an attachment hole 49 and alignment guide rails 51, by which bracket 41 is secured within the motion detector housing.

In the illustrated embodiment the mirror assembly and attached sensor bracket are secured in position within the motion detector housing by means of an optical assembly framework internal to the motion detector housing. The internal framework comprises upper and lower bracket members 52 and 53. Lower bracket member 53 is formed with an aperture corresponding to aperture 19 in the motion detector housing. Upper bracket member 52 is formed with three bore members 56, 57 and 58 having a central bore for receiving a screw, bolt or similar securement means. In the assembled configuration bore member 56 is positioned to align with hole 49 in sensor bracket 41, and the two are screwed together or equivalently secured to one another. Bore members 56 and 57 have a width corresponding to the lateral spacing between alignment guide rails 51 on bracket member 41 so that in position bore members 56 and 57 rest snugly between alignment guide rails 51. Mirror assembly 26 is provided with a tab 59, which may be attached to or otherwise rest against lower bracket member 53.

Lower bracket member 53 is formed with a tab member 60 for securing to upper bracket member 52. When the two bracket assembly members 52 and 53 are brought together, a hole in tab member 60 lies in registration with the central bore of bore member 57 so that the two bracket members may be secured together. A comparable securement hole 61 in lower bracket member 53 lies in registration with the central bore of bore member 58. The members 52 and 53 mate together to form an internal framework for the mirror assembly and sensor. The members 52 and 53 are each formed with central holes for securement to the motion detector housing and to the rest of the lighting fixture. In a typical construction common in lighting fixtures, a standard threaded rod extends into the motion detector housing, and here into the internal mirror assembly framework as well, and secured by means of nuts which are captured in the upper and lower bracket members at reference numerals 62 and 63.

The use of an internal optical assembly framework is advantageous in that it provides a means for securing the mirror assembly and sensor within the lighting fixture that is more or less independent of the detailed shape of the motion detector housing, and which may be secured within the motion detector housing by well known, standardized lighting fixture coupling techniques. For example, the generally saucer-like shape of the upper and lower bracket members 52 and 53 provides an internal framework that may be used in any font-like motion detector housing or other shapes of motion detector housing as well, and thus permits a single internal optical assembly framework to be manufactured that may be used with a variety of different lighting fixture styles with differently shaped motion detector housings. This avoids the need to custom manufacture a range of mounting hardware for the different motion detector housings. Notwithstanding the advantages of a separate internal optical assembly framework with standardized mechanical connection to the rest of the lighting fixture, other mechanical arrangements may be used as well. For example, bracket 41 may be adapted to be secured directly to the motion detector housing. Given the teachings provided herein, those skilled in the mechanical arts and familiar with motion detector and lighting fixture design will be able to devise other arrangements for supporting the mirror assembly and sensor in proper relation to one another and to the aperture to achieve the benefits of the invention, and all such support configurations are contemplated to fall within the scope of the invention.

FIGS. 7–9 show an alternative embodiment of a mirror assembly that may be used with the present invention to provide an even wider field of view and to provide three levels of view. This embodiment includes three tiers of mirror faces 65, 66 and 67. The central tier 65 includes two forwardly extending arms that terminate in distal extremities 68 and 69 that extend forward of the midportion of the tier by a considerably greater amount than the extremities of the embodiment of FIG. 2. The mirror faces at extremities 68 and 69 are thus each able to look under the opposite extremity along an optical path that reaches back behind the lighting fixture thereby defining a field of view greater than 180 degrees, even reaching as great as 220 degrees (i.e., lateral zones extending at least 110 degrees to the side of the lighting fixture). The two extreme optical paths 71 and 72 may be seen in FIGS. 8 and 9. These figures also illustrate that lateral zones are capable of extending at least 110 degrees to the side of the motion detector.

The three tiers 65, 66 and 67 define mid, near and far zones in the field of view as seen in FIG. 7. A general problem faced when introducing a plurality of levels of view is positioning the sensor so as not to lock any level of view. FIG. 7 shows a placement of a sensor 73 out of the plane of tier 65 and tilted downward that achieves a compact arrangement without blocking any level of view and without using secondary mirrors to diverT any of the optical paths around the sensor.

In embodiments of the mirror assembly illustrated here, there are no intervening lenses, mirrors or gratings in the optical path defined by any mirror face, and this makes it easier for the mirror assembly, sensor and support structures to fit within the volume available. The optical path runs straight from the aperture to the respective mirror face to the sensor. This optical path is preferred not only because it saves space by eliminating unnecessary optical elements, but also because it avoids the losses in intensity and aberrations that would otherwise be introduced at each auxiliary deflection of the optical path whether due to mirror reflection, lens refraction or grating diffraction.

Although a wide field of view is generally desired in decorative lighting fixtures to be mounted on an exterior wall of a house, in some uses a wide field of view may not be necessary. In such cases the mirror assembly need not be formed with a mirror tier having forwardly extending extremities aimed to look underneath one another to define the extreme lateral zones.

In the illustrated mirror assembly embodiments the mirror faces defining the far zones are arranged in one tier and those defining the near or mid zones are arranged in a second or third tier. This is done for ease of manufacturing. It is not necessary in defining multiple vertical levels of view that all mirror faces defining zones at the same level of view be arranged side by side in the same tier. However, two mirror faces defining zones at two different levels of view will be aimed in significantly different directions and will have significantly different curvatures and even overall shapes and sizes. If two such mirror faces are placed side by side in the mirror assembly, then the molding process for the mirror assembly will be more complicated and hence more expensive. Such complication is avoided when the mirror faces defining each level of view are disposed in side by side arrangement along a linear arc in a separate tier.

The mirror assembly of the present invention was devised to solve a problem in connection with decorative lighting fixtures as described above. The mirror assembly may nevertheless find beneficial application in other motion detector arrangements besides hidden motion detectors in decorative lighting fixtures. For example, a mirror assembly in accordance with the above teachings may find use in non-decorative utilitarian motion-activated lighting to provide a compact wide-angle motion detector without the use of plastic segmented Fresnel lenses. A mirror assembly in accordance with the above teachings may also find use in indoor wall-mounted motion detectors to provide for design possibilities not available with segmented Fresnel lenses.

The present invention recognizes that the segmented Fresnel lens system of the prior art may be completely eliminated by the use of a mirror assembly and sensor arrangement as described herein and that such a mirror assembly and sensor arrangement is capable of monitoring a sufficient number of zones with sufficient coverage for use with an outdoor decorative lighting fixture without the need for auxiliary lenses of any kind and without the need for any secondary mirrors interposed in the radiation path. Moreover, the mirror assembly and sensor arrangement may be placed in a compact decorative housing that may be incorporated into the ornamental design of the lighting fixture. To meet the needs of specialized applications, however, those skilled in the art may find it desirable in such special cases to supplement the field of view provided by the present invention by adding further monitored zones defined by a Fresnel lens or supplemental mirror arrangement that functions independently from the present mirror assembly and does not impair the ability of the present mirror assembly to function as described herein. Such configurations will enjoy benefits of the invention and are nevertheless considered to fall within the scope of the invention.

The above descriptions and drawings disclose illustrative embodiments of the invention. Given the benefit of this disclosure, those skilled in the art will be able to devise various modifications, alternate constructions, and equivalent ways for achieving the advantages of the invention. Therefore, the invention is not to be limited to the descriptions and examples disclosed herein, but is defined by the appended claims.

What is claimed is:

1. A decorative lighting fixture apparatus activated by a passive infra-red (PIR) motion detector incorporated into said lighting fixture for monitoring motion in a field of view, comprising:

a motion detector housing shaped to have a decorative external appearance and disposed to form an integral part of the decorative lighting fixture, said housing defining an aperture for admitting infra-red radiation from said field of view;

a PIR sensor disposed on a tapered fixture within said housing;

a mirror assembly disposed on said fixture within said housing and comprising a plurality of mirror faces formed and arranged to define a plurality of zones in said field of view, said mirror assembly directing said infra-red radiation from said plurality of zones to said sensor;

wherein said fixture is suspended from the top of said housing;

wherein each respective mirror face of said plurality of mirror faces defined an optical path in which said infra-red radiation admitted through said aperture from an associated zone is directed to said sensor solely by said respective mirror face; and wherein a central mirror face is disposed on-axis and peripheral mirror faces are disposed off-axis relative to said sensor; and wherein said mirror assembly is formed and arranged to direct said infra-red radiation to said sensor from zones at at least one vertical level of view; and a non-Fresnel lens aperture cover transmissive to said infra-red radiation, said aperture cover being disposed to cover said aperture and formed to generally conform to the shape of said housing.

2. The apparatus of claim 1 wherein said mirror assembly is formed and arranged to define zones at at least a first vertical level of view spaced over an angular width of at least 160 degrees.

3. The apparatus of claim 2 wherein said angular width is at least 180 degrees.

4. The apparatus of claim 2 wherein said mirror assembly is further formed and arranged to define zones at a second vertical level of view spaced over a second angular width of at least 180 degrees.

5. The apparatus of claim 1 wherein said mirror assembly comprises at least a first and a second mirror tier, each said mirror tier comprising a subplurality of said mirror faces arranged in side by side disposition, the mirror faces of said first and second tiers being formed and arranged to direct said infra-red radiation to said sensor from first and second vertical levels of view.

6. The apparatus of claim 5 wherein said first mirror tier is disposed above and vertically adjacent to said second mirror tier, and said first mirror tier is angled downwards relative to said second tier to define a first said vertical level of view close in to said lighting fixture relative to said second vertical level of view.

7. The apparatus of claim 6 wherein said first mirror tier has a midportion facing in a forward direction and has first and second extremities extending forwardly from said midportion and terminating in distal mirror faces at said extremities, wherein each of said distal mirror faces is disposed to define an optical path from an extreme lateral zone of said first vertical level of view passing approximately underneath the opposite said distal mirror face to said sensor.

8. The apparatus of claim 7 wherein the mirror faces of said first tier have decreasing focal lengths from the midportion of said first tier to said extremities, whereby the mirror faces of said first tier abut one another substantially along an arcuate line.

9. The apparatus of claim 6 wherein a plurality of distal mirror faces extend forward with respect to said second mirror tier.

10. The apparatus of claim 9 wherein said distal mirror faces are disposed to define lateral zones extending at least 90 degrees to the side of said lighting fixture, whereby the mirror faces of said first tier define zones spaced over an angular width of at least 180 degrees.

11. The apparatus of claim 9 wherein said distal mirror faces are disposed to define lateral zones extending at least 110 degrees to the side of said lighting fixture, whereby the mirror faces of said first tier define zones spaced over an angular width of at least 220 degrees.

12. The apparatus of claim 5 wherein said mirror assembly further comprises a third mirror tier, comprising a further subplurality of said mirror faces arranged in side by side disposition, the mirror faces of said third tier being formed and arranged to direct said infra-red radiation to said sensor from a third vertical level of view.

13. The apparatus of claim 1 wherein said motion detector housing comprises a lower portion having an outwardly bowing, generally saucer-like shape and said aperture is defined substantially in said lower portion.

14. The apparatus of claim 13 wherein said lower portion has a generally frusto-conical shape.

15. The apparatus of claim 13 wherein said lower portion has a profile, at least a segment of which is continuously curved.

16. The apparatus of claim 1 wherein said motion detector housing comprises a lower portion and an upper portion, each of said lower and upper portions having an outwardly bowing, generally saucer-like shape, and said aperture is defined substantially in one of said lower and upper portions.

17. The apparatus of claim 16 wherein said lower and upper portions are shaped to form said motion detector housing with the profile of a pre-existing decorative lighting fixture front and said aperture is formed substantially in said lower portion.

18. The apparatus of claim 1 further comprising an internal framework, wherein said mirror assembly and said sensor are mounted in motion detecting relation with one another within said internal framework, and said internal framework is mounted within said motion detector housing.

19. An internal passive infra-red (PIR) motion detector assembly apparatus for mounting within a saucer-shaped lighting fixture for monitoring motion in a field of view through a non-Fresnel lens cover, comprising:

a framework;

a PIR sensor disposed within said framework;

a mirror assembly disposed within said framework and comprising a plurality of mirror faces formed and arranged to define a plurality of zones in said field of view, said mirror assembly directing infra-red radiation from said plurality of zones to said sensor, wherein each respective mirror face of said plurality defines an optical path in which radiation from an associated zone is directed to said sensor solely by said respective mirror face;

wherein said mirror faces are arranged in at least two vertical tiers;

wherein said sensor is positioned out of a horizontal plane of all vertical tiers except for a vertical tier detecting infra-red radiation from a zone nearest to said sensor;

wherein said mirror assembly is formed and arranged to direct infra-red radiation to said sensor from zones at at least two vertical levels of view; and wherein said framework is adapted at at least one of a top position and a bottom position to be mounted within said lighting fixture.

20. The apparatus of claim 19 wherein said framework is formed with a first hole at a top position and a second hole at a bottom position, each of said first and second holes being formed for receiving a rod for attachment within said lighting fixture.

21. A mirror assembly apparatus for use with a passive infra-red (PIR) sensor in a PIR motion detector enclosed within a frusto-conically shaped housing for monitoring motion in a field of view through a non-Fresnel lens cover, comprising:

a plurality of mirror faces formed and arranged to define a plurality of zones in said field of view, said mirror faces being further arranged in at least a first and a second mirror tier, each said mirror tier comprising a subplurality of said mirror faces in side by side disposition, the mirror faces of said first and second tiers being formed and arranged to direct infra-red radiation directly to said sensor from first and second vertical levels of view, respectively, when said mirror assembly and said sensor are disposed in motion detecting relation in said motion detector;

wherein said sensor is positioned out of a horizontal plane of all vertical tiers except for a vertical tier detecting infra-red radiation from a zone nearest to said motion detector;

whereby each respective mirror face of said plurality of mirror faces defines an optical path in said motion detector in which said infra-red radiation from an associated zone may be directed to said sensor solely by said respective mirror face; and wherein the mirror faces of said first tier are formed and arranged to define zones spaced over an angular width of at least 160 degrees.

22. The apparatus of claim 21 wherein said angular width is at least 180 degrees.

23. The apparatus of claim 22 wherein the mirror faces of said second tier are formed and arranged to define zones spaced over an angular width of at least 160 degrees.

24. The apparatus of claim 21 wherein said first mirror tier is disposed above and vertically adjacent to said second mirror tier, and said first mirror tier is angled downwards relative to said second tier to define said first vertical level of view close in to said lighting fixture relative to said second vertical level of view.

25. The apparatus of claim 21 wherein said first mirror tier has a midportion facing in a forward direction when in motion detecting position in said motion detector and has first and second extremities extending forwardly from said midportion and terminating in distal mirror faces at said extremities, wherein each of said distal mirror faces is disposed to define an optical path from an extreme lateral zone of said vertical level of view passing approximately underneath the opposite said distal mirror face to said sensor.

26. The apparatus of claim 25 wherein the mirror faces of said first tier have decreasing focal lengths from the midportion of said first tier to said extremities, whereby the mirror faces of said first tier abut one another substantially along an arcuate line.

27. The apparatus of claim 25 wherein said distal mirror faces extend forward with respect to said second tier.

28. The apparatus of claim 27 wherein said distal mirror faces are disposed to define lateral zones extending at least 90 degrees to the side of said motion detector when in motion detecting disposition in said motion detector, whereby the mirror faces of said first tier define zones spaced over an angular width of at least 180 degrees.

29. The apparatus of claim 27 wherein said distal mirror faces are disposed to define lateral zones extending at least 110 degrees to the side of said motion detector, whereby the mirror faces of said first tier define zones spaced over an angular width of at least 220 degrees.

30. The apparatus of claim 21 wherein said mirror assembly further comprises a third mirror tier, comprising a further subplurality of said mirror faces arranged in side by side disposition, the mirror faces of said third tier being formed and arranged to direct said infra-red radiation to said sensor from a third vertical level of view.

31. The apparatus of claim 30 wherein said first mirror tier has a midportion facing in a forward direction when in motion detecting disposition in said motion detector and has first and second extremities extending forwardly from said midportion and terminating in distal mirror faces at said extremities, wherein each of said distal mirror faces is disposed to define an optical path from an extreme lateral zone of said first vertical level of view passing approximately underneath the opposite said distal mirror face to said sensor.

* * * * *